US009280908B2

(12) United States Patent
Isensee et al.

(10) Patent No.: US 9,280,908 B2
(45) Date of Patent: Mar. 8, 2016

(54) RESULTS OF QUESTION AND ANSWER SYSTEMS

(71) Applicant: International Business Machines Corporation, Armonk, NY (US)

(72) Inventors: Scott H. Isensee, Austin, TX (US); Robert C. Johnson, Jr., Pescadero, CA (US); David R. Schwartz, Bellevue, WA (US); David D. Taieb, Charlestown, MA (US); Cale R. Vardy, East York, CA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/840,704

(22) Filed: Mar. 15, 2013

(65) Prior Publication Data

US 2014/0272909 A1    Sep. 18, 2014

(51) Int. Cl.
*G09B 7/02*    (2006.01)
(52) U.S. Cl.
CPC ........................................ *G09B 7/02* (2013.01)
(58) Field of Classification Search
CPC ........................................................ G09B 7/02
See application file for complete search history.

(56) References Cited

U.S. PATENT DOCUMENTS

| | | | |
|---|---|---|---|
| 6,778,951 B1 | 8/2004 | Contractor | |
| 7,409,337 B1 | 8/2008 | Potter et al. | |
| 8,468,143 B1 | 6/2013 | Oztekin et al. | |
| 2002/0026435 A1 | 2/2002 | Wyss et al. | |
| 2002/0169595 A1 | 11/2002 | Agichtein et al. | |
| 2003/0105959 A1 | 6/2003 | Matyas, Jr. et al. | |
| 2005/0080614 A1* | 4/2005 | Bennett | 704/9 |
| 2006/0206472 A1 | 9/2006 | Masuichi et al. | |
| 2006/0206481 A1 | 9/2006 | Ohkuma et al. | |
| 2007/0022099 A1 | 1/2007 | Yoshimura et al. | |
| 2007/0118519 A1 | 5/2007 | Yamasawa et al. | |
| 2008/0040114 A1 | 2/2008 | Zhou et al. | |
| 2009/0162824 A1* | 6/2009 | Heck | 434/322 |
| 2009/0287678 A1 | 11/2009 | Brown et al. | |
| 2009/0292687 A1 | 11/2009 | Fan et al. | |
| 2010/0203492 A1 | 8/2010 | Nibe et al. | |
| 2011/0066587 A1 | 3/2011 | Ferrucci et al. | |
| 2011/0106617 A1* | 5/2011 | Cooper et al. | 705/14.49 |
| 2011/0125734 A1 | 5/2011 | Duboue et al. | |
| 2011/0153312 A1 | 6/2011 | Roberts | |

(Continued)

OTHER PUBLICATIONS

U.S. Appl. No. 13/798,417, Jun. 12, 2013, 1 page.

(Continued)

*Primary Examiner* — Alan Chen
(74) *Attorney, Agent, or Firm* — Francis Lammes; Stephen J. Walder, Jr.; Reza Sarbakhsh

(57) ABSTRACT

Mechanisms are provided for modifying an operation of a question answering (QA) system. An input question is received and processed to generate at least one query to be applied to a corpus of information. The at least one query is applied to the corpus of information to generate candidate answers to the input question from which a final answer is selected for output. A training engine modifies, using a machine learning technique that compares the final answer to a known correct answer for the input question, at least one of logic or configuration parameters of the QA system for at least one of the processing of the input question to generate the at least one query, applying of the at least one query to the corpus of information to generate the candidate answers, or the selecting of the final answer from the candidate answers.

24 Claims, 13 Drawing Sheets

(56) References Cited

U.S. PATENT DOCUMENTS

| | | | |
|---|---|---|---|
| 2012/0041937 A1 | 2/2012 | Dhillon et al. | |
| 2013/0103445 A1 | 4/2013 | Lord et al. | |
| 2013/0132308 A1* | 5/2013 | Boss et al. | 706/12 |
| 2013/0262501 A1 | 10/2013 | Kuchmann-Beauger et al. | |
| 2014/0272884 A1* | 9/2014 | Allen et al. | 434/322 |

OTHER PUBLICATIONS

U.S. Appl. No. 13/840,243, Jun. 11, 2013, 1 page.

"IBM Journal of Research and Development", IBM Corporation, vol. 56, No. 3/4, May/Jul. 2012, 208 pages.

Franta, W.R. et al., "Distributed Processing and Its Implications on Languages, Algorithms and Their Analysis", ip.com, IPCOM000128536D, electronic publication: Sep. 16, 2005, original publication: Dec. 31, 1976, 9 pages.

Franta, William R. et al., "Distributed Processing and Its Implications on Languages, Algorithms and Their Analysis", ip.com, IPCOM000151672D, electronic publication: Apr. 23, 2007, original publication: Jan. 31, 1976, 21 pages.

Gong, Chun-Lin et al., "Genetic algorithm based global optimization algorithm used to solving system analysis of multi-disciplinary optimization", IEEE, 2010 IEEE International Conference on Intelligent Computing and Intelligent Systems (ICIS 2010), Oct. 29-31, 2010, pp. 325-329.

Thompson, B.R. et al., "Linguistic Analysis of Natural Language Communication with Computers", ip.com, IPCOM000127944D, electronic publication: Sep. 14, 2005, original publication: Dec. 31, 1986, 21 pages.

* cited by examiner

400

```
IMPORT A DOCUMENT HAVING A SET OF QUESTIONS BASED ON THE CONTENT
OF THE DOCUMENT
405
        │
        ▼
AUTOMATICALLY CREATE A CANDIDATE QUESTION FROM THE CONTENT
410
        │
        ▼
AUTOMATICALLY GENERATE ANSWERS FOR THE SET OF QUESTIONS AND
CANDIDATE QUESTION USING THE CONTENT
415
        │
        ▼
PRESENT THE SET OF QUESTIONS, CANDIDATE QUESTION, AND ANSWERS TO
THE CONTENT CREATOR FOR VERIFICATION
420
        │
        ▼
STORE THE VERIFIED SET OF QUESTIONS IN THE DOCUMENT
425
```

*FIG. 4*

RESULTS OF QUESTION AND ANSWER SYSTEMS

BACKGROUND

The present application relates generally to an improved data processing apparatus and method and more specifically to mechanisms for improving the results generated by question and answer systems, such as the Watson question and answer system available from International Business Machines Corporation of Armonk, N.Y.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing comprising a processor and a memory, for answering questions about at least one previous execution of a question answering (QA) system on a previous input question, is provided. The method comprises receiving, in the data processing system, an input question directed to a previous execution of a QA system with regard to a previous input question. The method further comprises processing, by the data processing system, the input question to generate at least one query for application to a corpus of information. The corpus of information comprises information about the QA system and the previous execution of the QA system on the previous input question. The method also comprises applying, by the data processing system, the at least one query to the corpus of information to generate candidate answers to the input question, and ranking, by the data processing system, the candidate answers according to confidence measure values associated with the candidate answers to the input question. Moreover, the method comprises outputting, by the data processing system, a final answer for the input question based on the ranking of the candidate answers.

In yet another illustrative embodiment, a method, in a data processing system comprising a processor and a memory, for modifying an operation of a question answering (QA) system, is provided. The method comprises receiving, by the data processing system, an input question, and processing, by the data processing system, the input question to generate at least one query to be applied to a corpus of information. The method further comprises applying, by the data processing system, the at least one query to the corpus of information to generate candidate answers to the input question and selecting, by the data processing system, a final answer from the candidate answers for output. Moreover, the method comprises modifying, by a training engine associated with the data processing system, using a machine learning technique that compares the final answer to a known correct answer known to be a correct answer for the input question, at least one of logic or configuration parameters of the QA system for at least one of the processing of the input question to generate the at least one query, applying of the at least one query to the corpus of information to generate the candidate answers, or the selecting of the final answer from the candidate answers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to one or more of the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to one or more of the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart diagram of one embodiment of a method for question/answer creation for a document;

DETAILED DESCRIPTION

Figure 1:
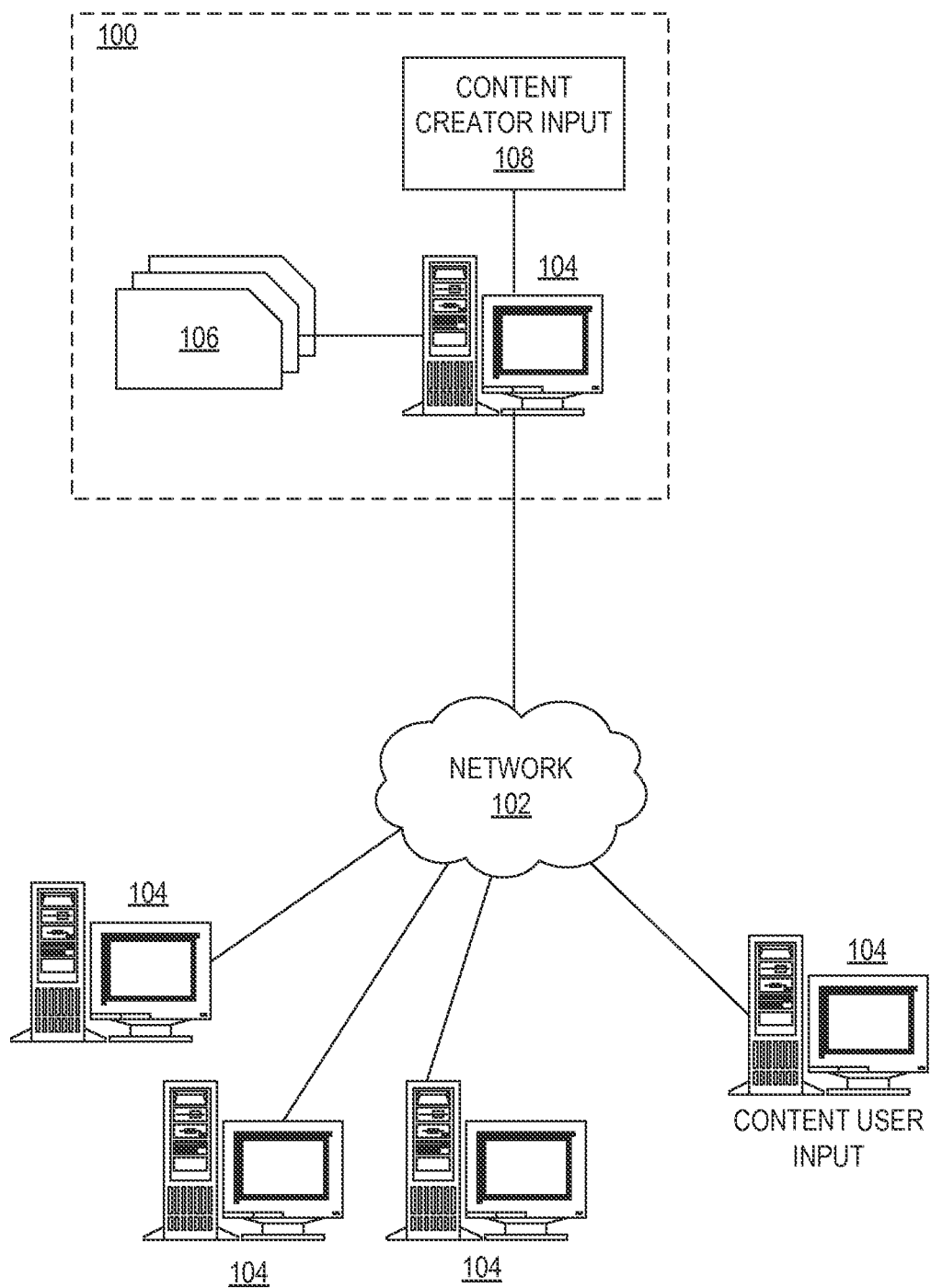
FIG. 1 depicts a schematic diagram of one illustrative embodiment of a question/answer (QA) system in a computer network.

Question Answering (QA) systems need to be trained in order to ensure that they operate correctly and provide adequate answer results. Such training is typically a laborious process involving a large amount of trial and error, time, and data analysis on the part of skilled human operators. That is, while certain aspects of this training may be automated with regard to the actual execution of the QA system and the generation of results, training still requires a large amount of human intervention to determine if the results that are generated by the QA system are adequate, can be improved, and how the QA system may be modified or adjusted to obtain improved results.

The illustrative embodiments provide mechanisms for improving the operation of a Question Answering (QA) system by providing automated mechanisms for indicating areas where improvement of the QA system may be obtained. In a first aspect of the illustrative embodiments, mechanisms are provided for identifying differences between training runs, or executions, of the QA system in order to answer questions posed with regard to the quality or accuracy of the results generated by the QA system and how those results may be modified. That is, the QA system may be used to answer input questions about the QA system. For example, questions such as "what changed between these runs?" or "what should I try to improve the accuracy of the results?" may be posed to the QA system and the QA system may parse these questions, generate corresponding queries, generate candidate answers with associated confidence measures, and provide these candidate answers, or at least the highest confidence candidate answer, to the question source, e.g., the human user, automated tool, or the like. The source of the answers for such questions, instead of being general unstructured documents in a corpus of information, is a training corpus of information comprising the results of one or more previous runs of the QA system on a set of training data, the training data itself, logs of one or more previous runs of the QA system, and the like.

The various queries generated from the parsing and decomposing of the input question may be applied to this training corpus of information and candidate answers are selected based on the results of the application of these queries. The results may be provided to a human user using information visualization techniques to assist users in identifying patterns in the training corpus of information, e.g., a group of documents used for training the logic of the question and answer system by adjusting parameters and values used to tune the logic to achieve more accurate results. The visualization technique involves graphically showing how answers text derived from each primary search query align with each other. With such visualization techniques, a user can easily identify which query yields the best answers. The user can also manually alter the queries to obtain better hits with the resulting information being used for headroom analysis by primary search algorithm developers.

The illustrative embodiments may further, based on the results of processing such questions regarding the results of the execution of the QA system on training data sets, identify other individuals who may be best able to handle changes to the QA system, the training data set, or the like, to address issues identified through the answering of these questions. That is, for example, if a question is posed as to "what changed between these runs?" of the QA system, the QA system may process this question and generate a result indicating the most likely candidate answers of what has changed between the runs of the QA system. In addition, the QA system may identify the source of such changes and individuals associated with these changes and inform them of the results of the QA system obtained as a consequence of these changes between runs. For example, assume that a Testing and Accuracy Analyst runs an experiment and finds that a certain metric has regressed in a current run relative to a prior run of the QA system on the testing data set. The QA system may, when the question "what changed between these runs?" is posed, or a similar question is posed, identify that changes were made to an annotator, such as a UIMA annotator, (i.e. a unit of code complying with specified interfaces of a framework which is responsible for generating annotations to the common data structures flowing through the framework pipeline, such as a UIMA annotator) between the runs and that this is likely the cause of the regression in the metric. For example, through analysis of the data corresponding to the two runs of the question and answer system, there may be no hard evidence that a particular annotator code change is responsible for the regression, however, circumstantial evidence coupled with other measurements provided by the tool (for example, a machine learning (ML) Feature score drop indicating that a particular feature used for machine learning is not predictive enough to contribute productively to the machine learning process) may be compelling enough to direct analysis attention to a particular annotator. ML Features are a primary input used to create ML Predictive models. Each ML feature corresponds to a property of the data which are usually numeric. These ML features are grouped into vectors for easier mathematical manipulation adapted to the chose ML algorithm. Using training sets of data, machine learning algorithms, e.g., logistic regression, are applied to the training data set to build a model that is used to calculate ML feature scores. In some cases, ML features in the model may be determined through the machine learning process, may be identified that are not predictive for a particular purpose. For example, for questions related to movies, a feature dealing with comedy can be dropped if the question is related to horror movies.

The question and answer logic automatically correlates changes and gives a confidence score for how likely this annotator change is responsible of the regression. That is, the mechanisms of the illustrative embodiments collect and analyze metrics, for example an ML Feature score dropped, and, knowing that this feature is output by the annotator, will increase confidence that it is responsible for the regression. Thus, the question and answer system of the illustrative embodiments comprises logic which identifies the changes in results metrics obtained for two or more runs of the question and answer system, correlates these changes with the portions of the question and answer system that contribute to these metrics, and determine a confidence score with regard to the possible causes of the change in metrics based on a level of involvement of the portion of the question and answer system in the generation of the metrics. In one illustrative embodiment, mechanisms may be provided for identifying portions of a question and answer system pipeline that contributes to the identified metrics.

The particular metrics that are the subject of such analysis may be specified in the input question or may be based on an automatic determination of the metrics to be considered based on the input question. For example, a general question of "why did the performance degrade between runs?" may result in the question and answer system logic identifying the metrics that increased/reduced by more than a certain threshold amount, e.g., absolute value, percentage, or the like, and then identify which portions of the question and answer system affected those metrics during the runs. Based on this analysis, a confidence score may be associated with each of these portions of the question and answer system based on the determined amount of affect that portions had on the overall metric to identify the most likely candidates that caused the change in performance. These confidence scores may then be used to return an answer that identifies the most likely causes of the performance degradation between runs. Similar analysis may be performed with regard to other types of questions that may be submitted for questioning the reasons for differences between runs or executions of the question and answer system.

The information gathered through the analysis performed by the question and answer system logic may then be used to generate a notification that is transmitted to the annotator developer, the particular person that made the modification to the annotator (if identifiable from comments in code or the like), etc., who may then fix the problem identified in the change to the annotator.

In a second aspect of the illustrative embodiments, human operators, analysts, or the like, are able to provide feedback ratings of candidate answers to posed questions during the training process and these feedback ratings are automatically processed in addition to the processing of the generated candidate answers to determine confidence measures for the generated candidate answers and refine a training model for performing machine learning during the training of the QA systems.

In a third aspect of the illustrative embodiments, mechanisms are provided for automatically identifying alternative question wordings and processing these alternatives automatically in separate threads or pipelines of processing that may be executed in parallel. Within each parallel thread or pipeline of execution the resulting candidate answers are ranked according to confidence measures. However, in addition, the separate alternative questions are ranked relative to each other to determine the question alternative that provides the best answer confidence measure. In this way, the QA system may, as part of its training, or even as part of its runtime operation, determine which alternative or version of a question is the most accurate and which answer to the most accurate question is the most accurate answer for that question. This aspect of the illustrative embodiments may, in some implementations, be combined with the first aspect above to use human operator rankings to assist in the ranking of question alternatives and/or the ranking of candidate answers for the various question alternatives.

In a fourth aspect of the illustrative embodiments, the mechanisms of the illustrative embodiments may cross-reference a posed question with questions previously submitted by other users and the candidate answers generated for these previously submitted questions. That is, with this aspect of the illustrative embodiments, a received question is parsed and analyzed to generate a plurality of queries that are stored in association with the question. The queries generated for the question may then be compared with queries generated for previously submitted questions to determine if there are related questions that were submitted by other users. Correlations between the current question and previously submitted questions may be drawn to determine which questions are related, even though the questions themselves may be different. The user, training algorithm, or the like, may then be informed of the related questions, the user that submitted the related questions, the candidate answers and their confidence measures for the related questions, and the like. In this way, a user that submitted the current question may be informed of the other users that are submitting similar questions and the results they obtained. This can be used to further train the machine learning models as well as can be used during runtime execution, in some implementations, to identify individuals of interest, such as in the case of law enforcement activities.

These and other aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
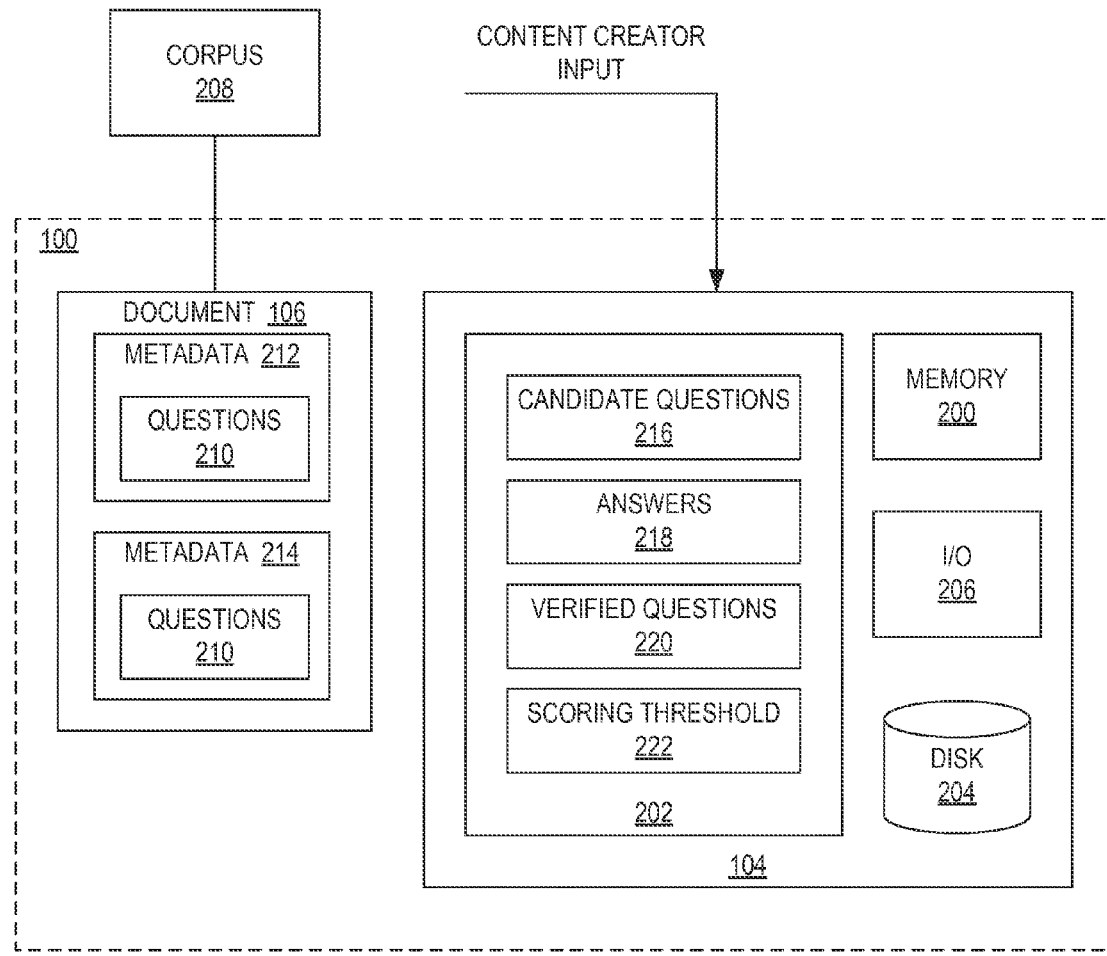
FIG. 2 depicts a schematic diagram of one embodiment of the QA system of FIG. 1.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1-4 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to improving the results generated by the QA system using automated training mechanisms and providing correlation and alternative question generation mechanisms during runtime execution. Thus, it is important to first have an understanding of how question and answer creation may be implemented before describing how the mechanisms of the illustrative embodiments are integrated in and augment such question/answer (QA) systems. It should be appreciated that the QA mechanisms described in FIGS. 1-4 are only examples and are not intended to state or imply any limitation with regard to the type of QA mechanisms with which the illustrative embodiments may be implemented. Many modifications to the example QA system shown in FIGS. 1-4 may be implemented in various embodiments of the present invention without departing from the spirit and scope of the present invention.

QA mechanisms operate by accessing information from a corpus of data (or content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating question and answer pairs based on the corpus of data, verifying answers to a collection of questions for the corpus of data, correcting errors in digital text using a corpus of data, and selecting answers to questions from a pool of potential answers. However, such systems may not be capable of proposing and inserting new questions which may not have been specified previously in conjunction with the corpus of data. Also, such systems may not validate the questions in accordance with the content of the corpus of data. Furthermore, with particular relevance to the illustrative embodiments described herein, conventional question answering (QA) systems do not provide and ability to automatically modify training models based on user feedback, provide automatic alternative question generation for training and runtime execution purposes, or provide automated related question identification and user correlation information, as is provided by the mechanisms of the illustrative embodiments as described hereafter.

Content creators, such as article authors, may determine use cases for products, solutions, and service before writing their content. Consequently, the content creators may know what questions the content is intended to answer in a particular topic addressed by the content. Categorizing the questions, such as in terms of roles, type of information, tasks, or the like, associated with the question, in each document of a document corpus may allow the system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, subsystems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to content users in a ranked list of answers.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to improving the results generated by an QA system 100.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
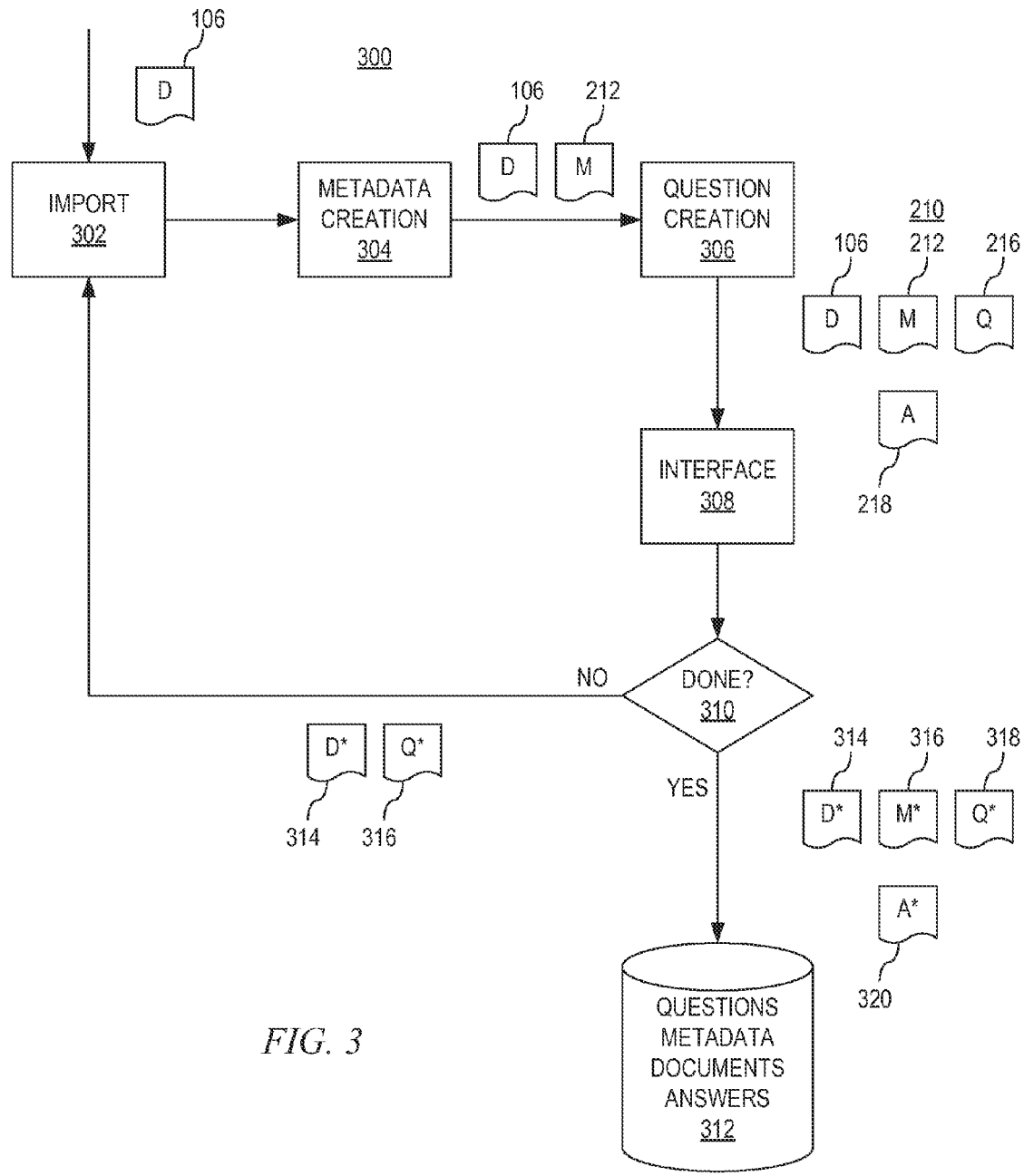
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

Thus, using the mechanisms described above, or equivalent mechanisms in other QA systems generally known in the art, a system is developed, and a corpus of content is created, that can be used to generate answers to natural language questions posed to the QA system. The QA system may comprise multiple engines or modules comprising logic for performing various operations for processing an input question in a natural language, searching a corpus of information for generating candidate answers to the input question, ranking or scoring the candidate answers, and performing a final merging of the scored or ranked candidate answers to generate a single ultimate answer to the input question. Thus, the QA system may comprise engines/modules for performing question analysis, content analysis of documents in a corpus of information, primary search, candidate answer generation, candidate answer scoring/ranking, and final merging of candidate answers.

Often times it is desirable to improve the accuracy of the QA system with regard to the answers generated to posed questions. This involves training the QA system by executing multiple runs of the QA system on one or more training data sets and modifying, as needed, the logic implemented by the QA system when performing its question answering functions to thereby improve the results generated. This can be done, for example, as part of an initial training operation for training the QA system prior to runtime deployment, may be a periodic training of the QA system after runtime deployment, or may be a continuous training of the QA system while the system is deployed in a runtime environment. As discussed above, while known mechanisms may implement some type of training of the QA system, such training is generally a manual process involving human testing and accuracy analysts who must manually review the data input to, data generated by, and logs of operations generated by the QA system to determine areas where improvements may be made and what improvements to make. Such operations require a great deal of trial and error and require skilled analysts to accomplish.

The illustrative embodiments provide mechanisms for automatically identifying areas of improvement, provide mechanisms for generating recommendations for such improvement, and provide mechanisms for actually improving the operation of a QA system with regard to the accuracy or confidence measures of candidate answers generated by the QA system. As mentioned previously, the illustrative embodiments provide mechanisms for answering questions posed regarding the results generated by the training of the QA system, mechanisms for allowing users to input ratings of the candidate answers which may then be processed by the QA system to determine improvements to the model or logic used by the QA system, mechanisms for automatically identifying alternative question formats for an input question and determining which alternative question format generates a higher level of performance of the QA system, and further provide mechanisms for identifying other questions posed by other users that are similar to a currently posed question, the results generated by these other questions, and information about the users that posed these other questions. These mechanisms may be used individually or in various combinations with each other to achieve the purposes of the particular implementation with regard to improving training and runtime performance of a QA system.

Figure 5:
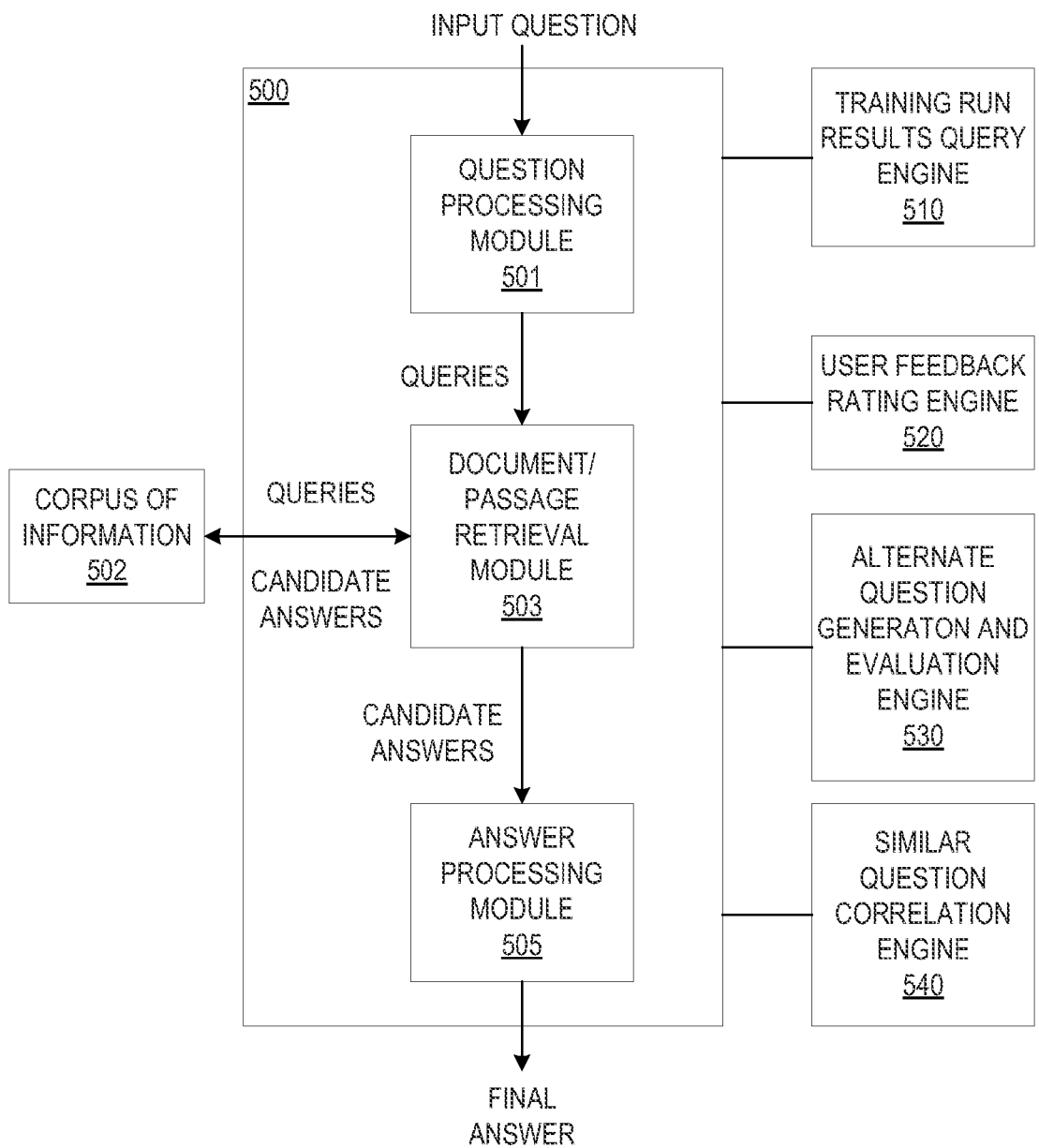
FIG. 5 is an example block diagram of a question and answer system implementing the mechanisms of the illustrative embodiments.

FIG. 5 is an example block diagram illustrating the primary operational elements of a QA system implementing the mechanisms of the illustrative embodiments. As shown in FIG. 5, a QA system 500 includes a question processing module 501, a document/passage retrieval module 503, and an answer processing module 505. For a natural language question raised by a user, question parsing and focus detecting are performed in the question processing module 501, which generates queries for the question. Then the document/passage retrieval module 503 applies the queries to a corpus of information 502, such as a database of structure and/or unstructured document data, and performs document filtering and passage post-filtering in a document containing the content, e.g., keywords matching criteria of one or more of the queries, so as to generate candidate answers. Afterwards, the answer processing module 505 performs candidate identification and answer ranking on the candidate answers generated by the document/passage retrieval module 503, and finally formulates an answer to the raised natural language question, so as to output a brief answer to the user in natural language.

In accordance with the mechanisms of the illustrative embodiments, the QA system 500 is further augmented to incorporate or be associated with a training run results query engine 510, user feedback rating engine 520, an alternate question generation and evaluation engine 530, and a similar question correlation engine 540. These engines 510-540 may be implemented, for example, as software instructions loaded into one or more memories and executed by one or more hardware processors of one or more data processing systems, for example. Alternatively, one or more of these engines 510-540 may be implemented completely, or at least partially, in hardware circuitry, such as in the case of an application specific integrated circuit (ASIC) or the like. These engines 510-540 provide additional logic to augment the capabilities of the QA system 500 to provide additional abilities for improving the training of the QA system 500 as well as the results generated by the QA system 500 during runtime execution.

The training run results query engine 510 provides logic for allowing users to use the QA system 500 to answer questions about the results generated by the QA system 500 of a previous run, or execution, of the QA system on a previously submitted question. This may generally be done with regard to the training of the QA system 500, but could also be employed after deployment of the QA system 500 during its runtime execution on user submitted questions.

With this logic, during training of the QA system 500, results from inputting a training question to the QA system 500 are generated by the QA system 500 processing a training set of data to generate a set of candidate answers with corresponding confidence measures. The primary difference between the training question and the training set of data is that the training question and the training set of data are specifically selected such that the training question is matched to the training set of data in a manner where the correct answer that should be generated by the QA system 500 is known a priori. Thus, based on the results generated by the QA system 500, and the correct results known a priori, one can determine whether the QA system 500 is operating on the training set of data as desired or not. In addition, one can determine where the QA system 500 may not be operating as desired and may determine modifications to the QA system's logic that should be made to improve the operation of the QA system 500 so as to achieve an operation closer to that desired and thus, results that are closer to the known correct result.

A set of questions can be assigned to training and testing sets randomly. The questions do not differ in nature from those submitted during runtime execution of the QA system 500, but it is important that the training set of questions be separate from runtime question sets. The training questions are used to tune the QA system 500 algorithms and then the testing or runtime set may be used to evaluate how well the QA system 500 has learned through the training process. This is analogous to a human teacher asking students questions during a class to help them learn, and then later giving them a test to evaluate how well they have learned the material. Those questions can all come from the same pool, but the training and testing sets need to be different otherwise one would be measuring memorization rather than learning.

During the training process, multiple runs, or executions, of the QA system 500 on the same or similar questions using the same or similar training set of data may performed with modifications to the QA system 500, the training set of data, or the like, being performed between these multiple runs in an effort to improve the operation of the QA system 500 and the results generated. With the mechanisms of the illustrative embodiments, and in particular the training run results query engine 510, a user may turn the operation of the QA system 500 onto the results data generated by the QA system 500 on one or more previous runs of the QA system 500 on one or more previous training questions and training sets of data, the QA system 500 logic or modules themselves, and the like. That is, the QA system 500 operates on the QA system 500 itself to answer questions posed by the user regarding the reasoning behind differences in one run of the QA system 500 and another run of the QA system 500.

For example, given two runs of the QA system 500 using the same or similar question and the same or similar training set of data, a user may look at the results of the two runs and want to know why certain metrics associated with the results of one run are different from the other, e.g., improved or made worse. Thus, the user may pose a question such as, for example, "what changed between these runs?", "what caused the overall confidence in the candidate answers to decrease?", or "what should I try in order to improve the accuracy of the runs?" The QA system 500 may, in response to such a question being input, perform similar functionality when answering other questions posed to the QA system 500 to parse the question and generate one or more queries to be applied to a corpus of information. The corpus of information in this case, however, is not comprised of structured or unstructured documents of content, but instead the results data generated by the QA system 500 for the runs in question, the logs of such runs if any, the code of the modules of the QA system 500 involved in the runs, configuration files for configuring the QA system 500, and/or other data/code involved in the performance of the QA system 500 functions for generating the results data for the runs In some illustrative embodiments, a data structure may be generated by human analysts and those knowledgeable of the operations of the QA system 500 and the manner by which the QA system 500 generates results, to indicate the most likely sources of changes or differences in one or more metrics of results in a QA system 500. This data structure may specify, for example, that is metric A changes from one run to the next, that the most likely sources of this change are sources B, C, and D, e.g., a change in the code of module A, a change in a configuration parameter B, a change in training data set C, etc. Furthermore, such a data structure may specify degrees or threshold values of change and corresponding most likely candidates for the source of such changes. Any information that may be indicative of sources of changes in results generated by the QA system 500 between runs or executions of the QA system 500 may be used as part of the corpus of information upon which the QA system 500 may operate in accordance with the mechanisms of the illustrative embodiments.

In applying the queries for the input question to the corpus of information comprising the results generated by the execution of the QA system 500 on another question and another corpus of data, e.g., a training set of data, in one or more previous runs of the QA system 500, the QA system 500 may draw correlations between changes made in logic of the QA system 500 (e.g., the code of one or more modules of the QA system 500), changes made in the training set of data, changes made in the input question, or the like, and differences in the results generated from one run of the QA system 500 to the next. For example, the QA system 500 may receive a question such as "Why did the confidence of the candidate answers decrease?" In response to such a question, the QA system 500 may parse the question and generate one or more queries based on the content of the input question. The queries may be applied to the corpus of information comprising the results of the previous run of the QA system 500, code of the QA system 500 modules involved in the previous run, configuration information for the previous run, any knowledge base data structures, and the like. In the process of applying the queries to the corpus of information, the QA system 500 may determine that the results of the second run of the QA system 500 have a confidence measure of the candidate questions that is, on average, 10 percent lower than the results of a first run of the QA system 500, that the logic of a code module A was changed between the first run and the second run, and that modifications to one of modules X, Y, A, or Z are most likely the cause of a reduction in confidence measure of 10 percent or more as indicated in a knowledge base data structure. Based on all of this information, the QA system 500 may determine that the most likely reason for the reduction in confidence of the candidate answers is the code changes made to module A.

This information may be reported back to the source of the input question. Moreover, additional information about the changes that caused the difference in results between runs may be returned with this notification. For example, a determination may be made as to who made the changes, when the changes were made, what lines of code were changed, the specific differences between the logic of one run as opposed to the other run(s), and the like. This information may be determined from comparing the versions and results of the QA system runs, looking at metadata associated with the QA system logic, and the like.

The information may be output to a user via the source of the input question, e.g., a client computing device, server, or the like. In one illustrative embodiment, the candidate answers to an inserted question may be output to the user via a visualization mechanism which generates a visual output comparing and contrasting the various answers and their corresponding confidence measures with regard to the input question. From this visualization, a user may identify the most likely final answer to the input question. Moreover, the visualization mechanism may identify the final answer to the input question as the candidate answer having a highest measure of confidence. The confidence measures themselves may be generated using an elaborate framework for ranking candidate answers. This elaborate framework may involve, for example, (1) a candidate answer merging phase where answers that are deemed to be equivalent are merged by having the question and answer system select a most complete form of the answer; (2) a feature merging phase in which the question and answer system performs operations to make sure that the same answer returned from different searches do not have duplicate features, thereby resulting in a features vector where each feature has only one value; (3) a final merger phase in which machine learning predictive models are used to perform more elaborate answer merging; and (4) a ranking phase in which the remaining candidate answers are ranked according to their evidence scores (determined by a plethora of scorer annotators) and a final judgment of the likelihood that a particular candidate answer is the correct final answer is made. The actual scoring, or confidence measures, are generated based on supporting evidence identified by the question and answer system which formulates a hypothesis (candidate answer), performs a search for evidence in support of the hypothesis, and generates a score for the hypothesis based on a direct correlation of the quality of the supporting evidence that is found. More information about scoring and confidence measure generating mechanisms that may be used with a question and answer system may be found, for example, in the IBM Journal of Research and Development, 2012, Volume 56, Issue 3.4, which is hereby incorporated in its entirety by reference.

The candidate answer information, and additional information regarding the changes contributing to the candidate answers, may be used to identify the individual humans that contributed to the candidate answers, e.g., the professionals that are responsible for changes to the QA system, training set of data, or the like, that most likely resulted in the particular conditions corresponding to the candidate answers. For example, the final answer may be manually or automatically identified from the information generated by the QA system in response to the input question, e.g., through analysis of the resulting visualization of the candidate answers, automated analysis of the candidate answers and their corresponding confidence measures, and the like. The resulting annotators, logic, versions of training data, or the like, corresponding to the final answer may be further analyzed to identify the individuals responsible for changes to these annotators, logic, versions of training data, or the like. Contact information for these individuals may be retrieved, such as from a directory data structure or the like, and notifications may be generated and transmitted to these individuals to indicate the differences in the runs of the QA system as a result of the changes that these individuals made to the identified annotators, logic, versions of training data, or the like. In this way, these individuals may be able to review the resulting effects on the QA system generated as a result of their changes and determine if further modifications are warranted.

Figure 6:
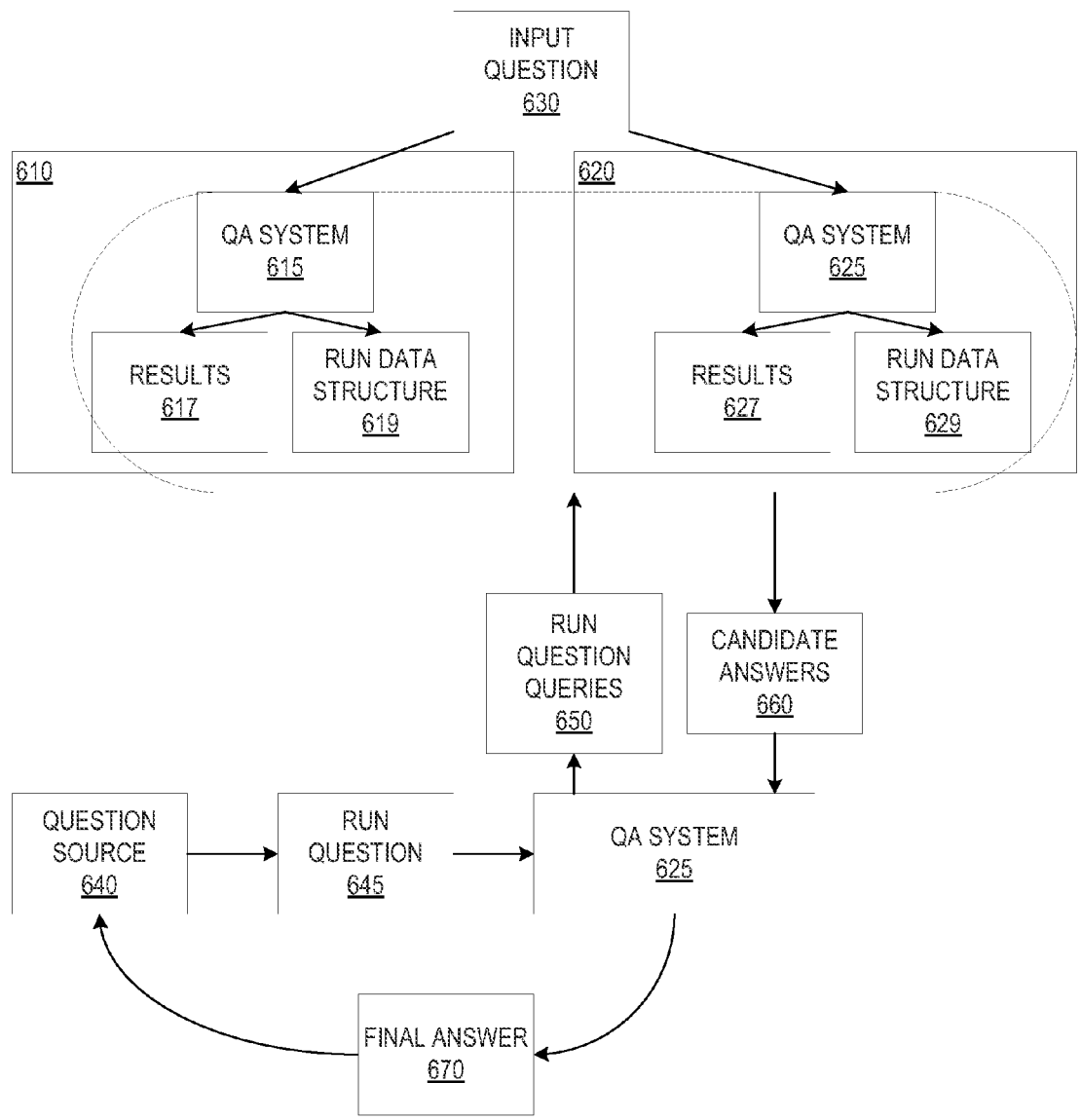
FIG. 6 is an example diagram illustrating an operation for applying a question answering system to answer questions regarding results previously generated by the question answering system.

FIG. 6 is an example diagram illustrating an operation for applying a question answering system to answer questions regarding results previously generated by the question answering system. The example shown in FIG. 6 assumes that one wishes to obtain information about changes in results obtained between two different runs or executions of the QA system. However, it should be appreciated that the mechanisms of the illustrative embodiments may be implemented with any number of runs or executions of the QA system. In fact, the mechanisms of the illustrative embodiments may be used to answer questions posed regarding the results generated by a single run or execution of the QA system, or three or more runs or executions of the QA system.

As shown in FIG. 6, multiple runs 610, 620 of a QA system are executed using the same input question 630 and same training set of data 640. Between runs 610 and 620, the QA system 615 may be modified, such as by modifying the code of one or more modules, modifying one or more configuration parameters, or the like, to generate a modified QA system 625. The runs 610, 620 of the QA system generate results 617 and 627 which may be different from one another due to the changes made to the QA system 615 to generate modified QA system 625. In addition, the runs 610, 627 may generate or be associated with data structures 619, 629 that store information about the actual operation of the logic of the QA system 615, 625 during the runs 610, 620, such as log data structures, knowledge base data structures, and the like.

A user, or automated tool, referred to herein as a question source 640, may submit an input question 645 directed to the nature or reason that the results 617 and/or 627 are generated. In the depicted example, the input question 645 may question the reasons behind why, or what caused, the results 627 generated by the modified QA system 625 differ from the results 617 generated by the non-modified QA system 615. For example, the input question 645 may question what changed between runs 610 and 620, why certain metrics changed by a specified amount between runs 610 and 620, where improvements to the results 617, 627 may be generated and what modifications would be required to obtain such improvements, or any of a plethora of other questions directed to the operation of the QA system itself or the reasons behind why the results 617, 627 were generated.

In response to receiving the input question 645 into the QA system, the QA system parses the input question 645 to generate a parse tree which may be used to obtain specific information, such as the Lexical Answer Type (LAT) (describes the type of entity the question is asking for, e.g., person, city, movie, etc.) and Focus (i.e. the part of the question that, if it were replaced with the answer, would generate a grammatically correct true sentence, e.g., for the question "who is the first man to work on the moon?" the LAT is "person" and the Focus is "who"), to determine where the question is directed, i.e. is the question one directed to the content of the corpus of information or is the question directed to the results of a previous run of the QA system. Moreover, custom annotators may be provided in the query generation logic of the QA system which can perform custom analysis of the input question 645 to determine the scope of the question 645 and modify the query that will be applied to the corpus and even the corpus upon which the queries are applied, i.e. the general corpus of information the QA system uses to answer questions in general, or the previous run corpus which contains the information about one or more previous runs of the QA system, modifications performed to the QA system between runs, and the like.

In response to receiving the input question 645 and performing the parsing of the input question 645, the QA system generates corresponding queries and applies them 650 to the corpus of information comprising the data directed to the QA system itself and the results previously generated by the run/execution of the QA system on the training question and training set of data. The resulting candidate answers 660 generated by the application of the queries to the corpus of information are returned to the QA system 625 and ranked to generate a final answer 670 that is returned to the source 640 of the input question 645. Alternatively, all of the candidate answers 660 along with their confidence measures, and other corresponding information, may be returned to the source 640 for consideration.

Thus, the mechanisms of the illustrative embodiments may be used to cause a QA system to answer questions about itself and a previous run, or runs, of the QA system. The insights generated from this application of the QA system may be used by human analysts, programmers, and the like, to identify reasons for changes in results generated by a QA system between runs, identify areas where improvement of the operation of the QA system may be obtained, and the like. Thus, the QA system may be used to identify ways to improve the QA system itself.

As mentioned above, additional features of the illustrative embodiments provide improvements for training QA systems and for improving results generated during runtime execution of the QA system after deployment. One such additional feature is the use and integration of user feedback ratings of candidate answers to submitted questions. By allowing users to provide an indication as to the relevance and accuracy of a candidate answer to a posed question, a more accurate operation of the QA system may be achieved.

Figure 7:
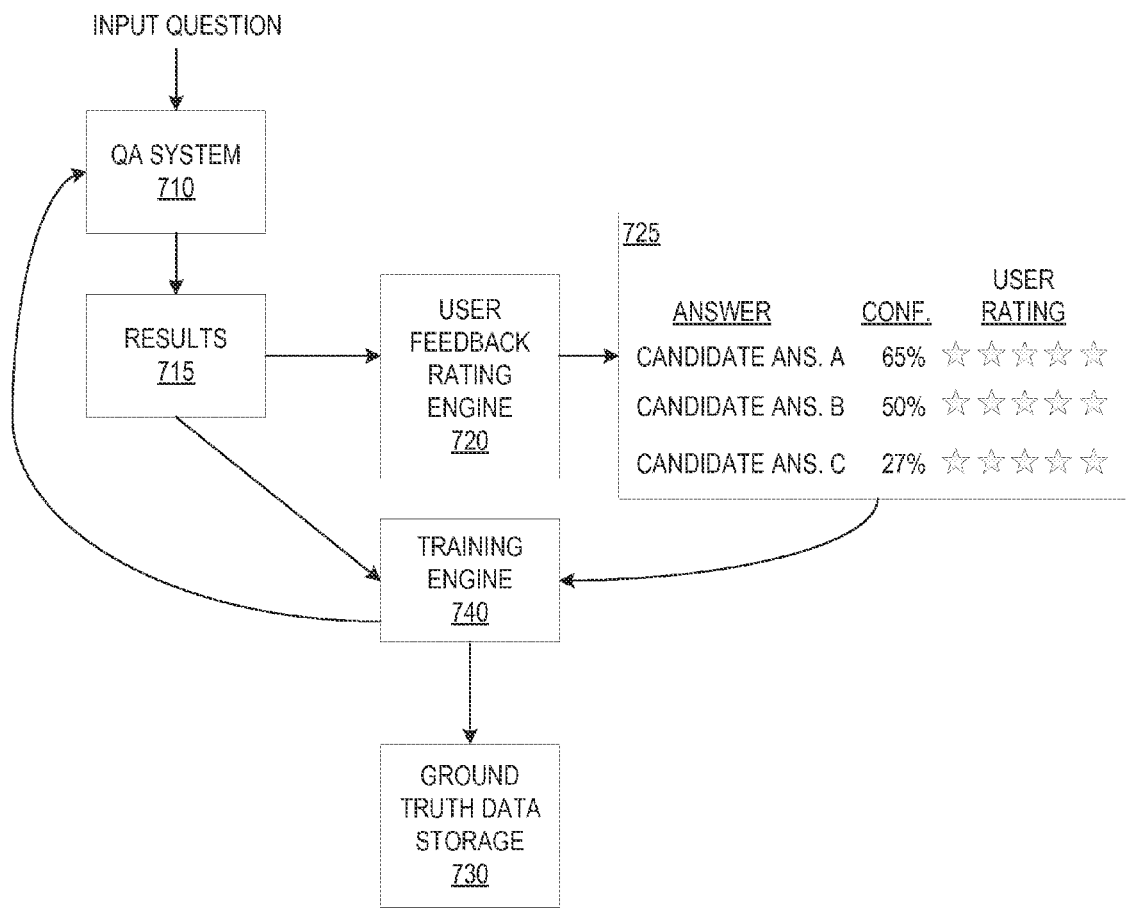
FIG. 7 is an example diagram illustrating an operation for utilizing user feedback ratings of candidate questions in the process of training the logic or model used by a question answering system in accordance with one illustrative embodiment.

FIG. 7 is an example diagram illustrating an operation for utilizing user feedback ratings of candidate questions in the process of training the logic or model used by a question answering system in accordance with one illustrative embodiment. As shown in FIG. 7, the QA system 710 may be augmented to include, or be associated with, a user feedback rating engine 720, such as the user feedback rating engine 520 in FIG. 5. The user feedback rating engine 720 provides logic for presenting a listing of candidate answers generated by the QA system 710 and provided in the results 715, as well as their confidence measures, answer source information, e.g., corpus, document, etc., and the like, via a user interface 725. The user feedback rating engine 720 further provides the user interface 725 with elements and/or fields through which user input is received for rating the quality of the candidate answers and/or answer source information presented in the results 715.

The results 715 generated by the QA system 710 are compared, by the training engine 740, to correct answers stored in the ground truth data storage 730. That is, since this is training of the QA system 710, the training performed by the training engine 740 involves the use of a known input question on a known training set of data with the goal being for the QA system 710 to generate the known correct answers stored in the ground truth data storage 730. Thus, if the QA system 710 is not operating properly, or is operating at less than a desired performance, the QA system 710 will generate answers that are different from that of the known correct answers in the ground truth data storage 730. Therefore, by comparing the generated results 715 to the known correct answers in the ground truth data storage 730 using the logic and mechanisms of the training engine 740, one can determine whether the QA system 710 is operating in a desired manner and where differences occur between the answers generated by the QA system 710 and the correct answers.

The user feedback rating engine 720 is utilized to add additional insight into the results 715 generated by the QA system 710 by providing an indication of the usefulness or user perceived quality of the answers generated in the results 715. Thus, by comparing the results 715 to the known correct answers in the ground truth data storage 730 one can determine whether the QA system 710 is operating as desired. By analyzing, using the logic and mechanisms of the training engine 740, the user feedback input via the user feedback rating engine 720, one can determine the relative usefulness or quality of the answers generated by the QA system 710 to the user, which may or may not be consistent with what the ground truth data storage 730 indicates to be the correct answers. As a result, the training system 740 of the illustrative embodiments may modify the operation of the QA system 710 taking into account the user rating feedback information along with the differences between the results 715 and the correct answers specified in the ground truth data storage 730.

Thus, the user rating feedback information may be used to refine the training performed by the training engine 740 based on the identified differences between the results 715 and the correct answers specified in the ground truth data storage 730. The modifications to the QA system 710 based on user rating feedback may be implemented, for example, in various ones of the modules/engines of the QA system 710 such as in the answer scoring/ranking module/engine, the final merger module/engine, or the like.

For example, if the ground truth data storage 730 indicates that answer B is the correct answer for the training question, and the results indicate answer A to be the correct answer with a particular measure of confidence, the logic of the QA system 710 may be adjusted, or configuration parameters may be adjusted, to decrease the confidence measure of answer A and increase the confidence measure of answer B. These adjustments may be made manually or automatically.

In addition, the user feedback ratings of the candidate answers may further be used to modify the logic or configuration parameters so as to increase the confidence measures of the answers the users found to be most useful or having the highest quality while reducing those that have a relatively lower user feedback rating. Thus, in the above example, the logic or configuration parameters may be adjusted to increase the confidence measure of answer B, and the user feedback, if relatively low, may be used to adjust the logic or configuration parameters to reduce the confidence measure of answer B by a relative amount corresponding to the user feedback. Similarly, while the logic or configuration parameters may be adjusted to reduce the confidence measure of answer A, the user feedback may be used to increase the confidence measure of answer A if the user feedback for answer A is relatively higher than other candidate answers.

For example, assume that the user poses the training question "Who was the man that crossed the Potomac?" There may be multiple candidate answers that may be returned by the QA system 710 in the results 715 with separate confidence measures for each of these candidate answers. For example, through parsing the training question, generating queries, and applying the queries to a training set of data, the QA system 710 may generate candidate answers of "George Washington," "Washington", and "General Washington" with corresponding confidence measures in which "Washington" has a highest confidence measure, "George Washington" has a second highest confidence measure, and "General Washington" has a third highest confidence measure. Thus, "Washington" would be the answer returned by the QA system 710 under normal runtime operations.

The ground truth data storage 730 may identify the correct answer to be "General Washington" and thus, the training system may adjust the logic of the QA system 710, its configuration parameters, or the like, to modify the operation of the QA system 710 to increase the confidence value of the candidate answer "General Washington" while decreasing the confidence value of the other candidate answers relative to the candidate answer "General Washington." However, when taking into consideration the user feedback ratings, assume that the user is presented with a listing of the candidate answers and options or fields through which a user may specify a rating of each of the candidate answers, via the user feedback rating engine 720. The user may specify, for example, that the candidate answer "George Washington" is the most useful answer, or the answer having the highest quality, relative to the other candidate answers, and that the answers "General Washington" and "Washington" have relatively lower and lowest user ratings.

Taking into account these user ratings, the logic, configuration parameters, or the like, may be modified such that the answer "George Washington" has its confidence measure decreased based on the comparison to the correct answers in the ground truth data storage 730 and increased based on the user feedback. Similarly, the QA system 710 is trained such that the confidence measure associated with the answer "Washington" is decreased based on the comparison with the ground truth data storage 730 and further decreased based on the user feedback. The QA system 710 is also trained to increase the confidence measure associated with the answer "General Washington" based on the comparison with the ground truth data storage 730 and decrease the confidence measure based on the user feedback. Thus, the user feedback may be used to adjust the training of the QA system 710.

In one illustrative embodiment, the user feedback, obtained via the user feedback rating engine 720, may be accumulated for an answer source and may be used to modify the confidence measures associated with the answer source. That is, the QA system 710 may identify the sources upon which the QA system 710 relies for each of the candidate answers in the results 715. Based on the user's feedback rating for the candidate answers, corresponding user feedback ratings for the sources contributing to the candidate answers may be modified based on the user's feedback rating for the candidate answer. Thus, if a user rates the candidate answer to be relatively lower quality or less useful, then the rating for the answer source may be likewise reduced to indicate the quality or usefulness of the information obtained from that answer source. This information may be used when generating the confidence measures of the candidate answers during subsequent runs of the QA system 710. Furthermore, the user ratings for answer sources may be accumulated across multiple runs of the QA system 710, based on a variety of input questions submitted by the same or different users, and the like.

Thus, the illustrative embodiments provide mechanisms for incorporating user feedback ratings into the training of a QA system 710 to achieve better results of a QA system 710 both with regard to pre-determined correct answers for the training question based on the training set of data, and based on the user perceived usefulness or quality of the candidate answers generated by the QA system 710 during the training. In addition, with regard to some illustrative embodiments, the training, or runtime execution, of a QA system 710 may be improved by taking into account different formulations of input questions.

Figure 8:
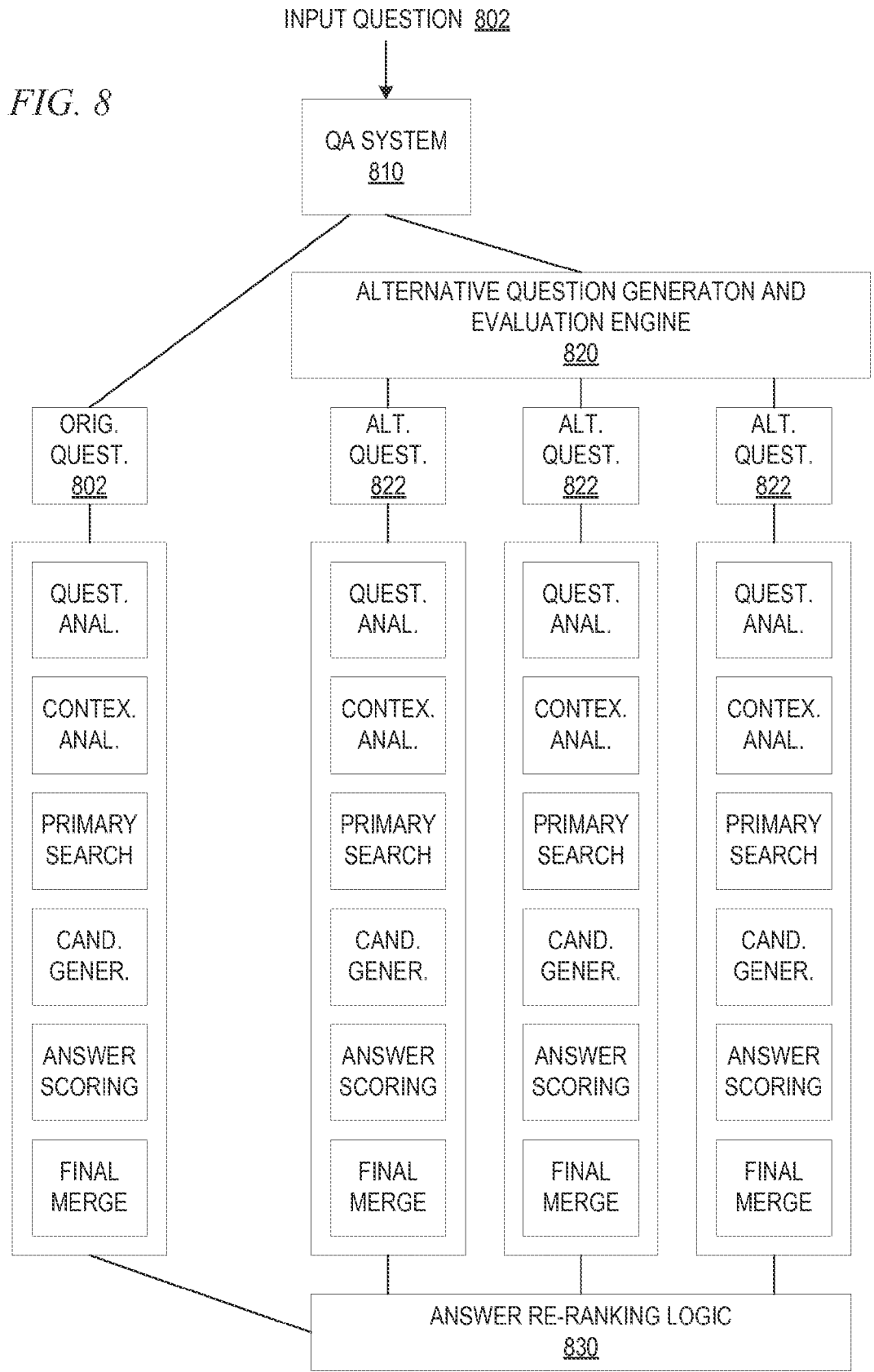
FIG. 8 is an example diagram illustrating an operation for generating and processing alternative question formats and ranking both alternative question formats and candidate answers associated with the different alternative question formats in accordance with one illustrative embodiment.

FIG. 8 is an example diagram illustrating an operation for generating and processing alternative question formats and ranking both alternative question formats and candidate answers associated with the different alternative question formats in accordance with one illustrative embodiment. As shown in FIG. 8, the QA system 810 may be augmented to include, or be associated with, an alternative question generation and evaluation engine 820, such as the alternate question generation and evaluation engine 530 in FIG. 5. The alternative question generation and evaluation engine 820 provides logic for generating alternative formats or versions of an input question 822-824 and submitting these alternative formats or versions of an input question 822-824 along with the original input question 802 to the QA system 810 for execution is parallel.

The alternative formats or versions of the input question 822-824 may be generated in many different ways. For example, the alternative formats or versions may be generated by reordering the wordings of the original input question, changing the inflection of one or more words in the original input question, using synonyms for words in the original input question to replace the words in the original input question, and the like. Thus, for example, a question may be submitted such as "what are the symptoms of a heart attack?" Alternative versions of this question may include "what are heart attack symptoms?", "what are the symptoms of heart attacks?", "what are symptoms of cardiac infarction?", "what are symptoms of infarction of heart?", "what are symptoms of myocardial infarction?", and the like.

Various data structures, including synonym list data structures, dictionaries, inflection modification logic, prepositional phrase analysis and modification logic, and the like, may be used to generate modified versions of the original question. For example, a synonym list data structure may be used to perform a lookup of words in an original question and retrieve one or more synonyms of the word which may then be used to replace the original word in the original input question to generate an alternative version of the original question. Inflection logic may be used to change the tense of words in the original question. Prepositional phrase analysis and modification logic may identify prepositional phrases in an original input question and reorder the wordings of these prepositional phrases or introduce prepositional phrases into an original input question to thereby generate alternative versions of the original input question.

The QA system 810 operates in parallel on each of the various versions of the input question 802 and 822-824 to perform question analysis to generate queries for performing searches, applying the queries to a corpus of information to perform a primary search of this corpus of information, generating candidate answers for each parallel thread of execution based on these applications of queries, scoring/ranking these candidate answers within each thread, and performing a final merge of the candidate answers to generate a final answer for each thread along with the corresponding measure of confidence.

Thus, for example, in the depicted example, a separate set of candidate answers is generated for each of the alternative versions of the input question 802, 822-824 and a separate final answer for each of these versions is likewise generated. The candidate answers and/or the final answer generated for each of these threads of execution may be re-ranked, by the answer re-ranking logic 830, relative to one another to generate the final answer to the original input question 802. While answer re-ranking logic 830 is shown as a separate entity in FIG. 8 for ease of depiction, in actuality the answer re-ranking logic 830 may be integrated with and part of the alternative question generation and evaluation engine 820, which may provide the additional logic for performing the operations described hereafter as well. This final answer may be a candidate answer generated by one of the alternative versions 822-824 as opposed to the ones generated based on the original version of the input question 802. The final answer may be selected as an answer having a highest confidence measure across all of the candidate answers generated for each of the alternative versions of the question 802, 822-824, or across the final answers generated for each of the alternative versions of the questions 802, 822-824. In this way, the mechanisms of the illustrative embodiments may not only select the most likely answer to the original input question 802, but also may select the alternative version 802, 822-824 of the original input question 802 that provides the highest measure of confidence in the final answer.

The selection of the version of the question that provides the highest measure of confidence in the final answer may be used as input to the training engine 840 for modifying the operation of the QA system 810 so as to utilize versions of questions similar to the version providing the highest measure of confidence. That is, the indication of the version of the question that provides the highest measure of confidence may be used to inform the QA system 810 of which versions of questions to generate when performing analysis of questions and generating queries to be applied to a corpus of information. These modifications to the QA system 810 as part of the training of the QA system 810 may be implemented in the logic of the question analysis module or engine of the QA system 810, for example.

Thus, in addition to answering questions regarding previous runs of a QA system and providing mechanisms for incorporating user ratings into the training of a QA system, the illustrative embodiments provide mechanisms for incorporating alternative question formats or rewordings into the training and/or operation of the QA system to further increase the accuracy of the results generated by the QA system. Moreover, in further illustrative embodiments, provide mechanisms for correlating similar questions that have been previously submitted by the same or other users. These embodiments may be implemented in the QA system during runtime execution or may be integrated with, for example, the alternative question generation mechanisms during training or runtime as previously described. That is, if integrated with the alternative question generation mechanisms, the correlation of similar questions previously submitted may be used to assist is determining what alternative question formats/rewordings to utilize.

Figure 9:
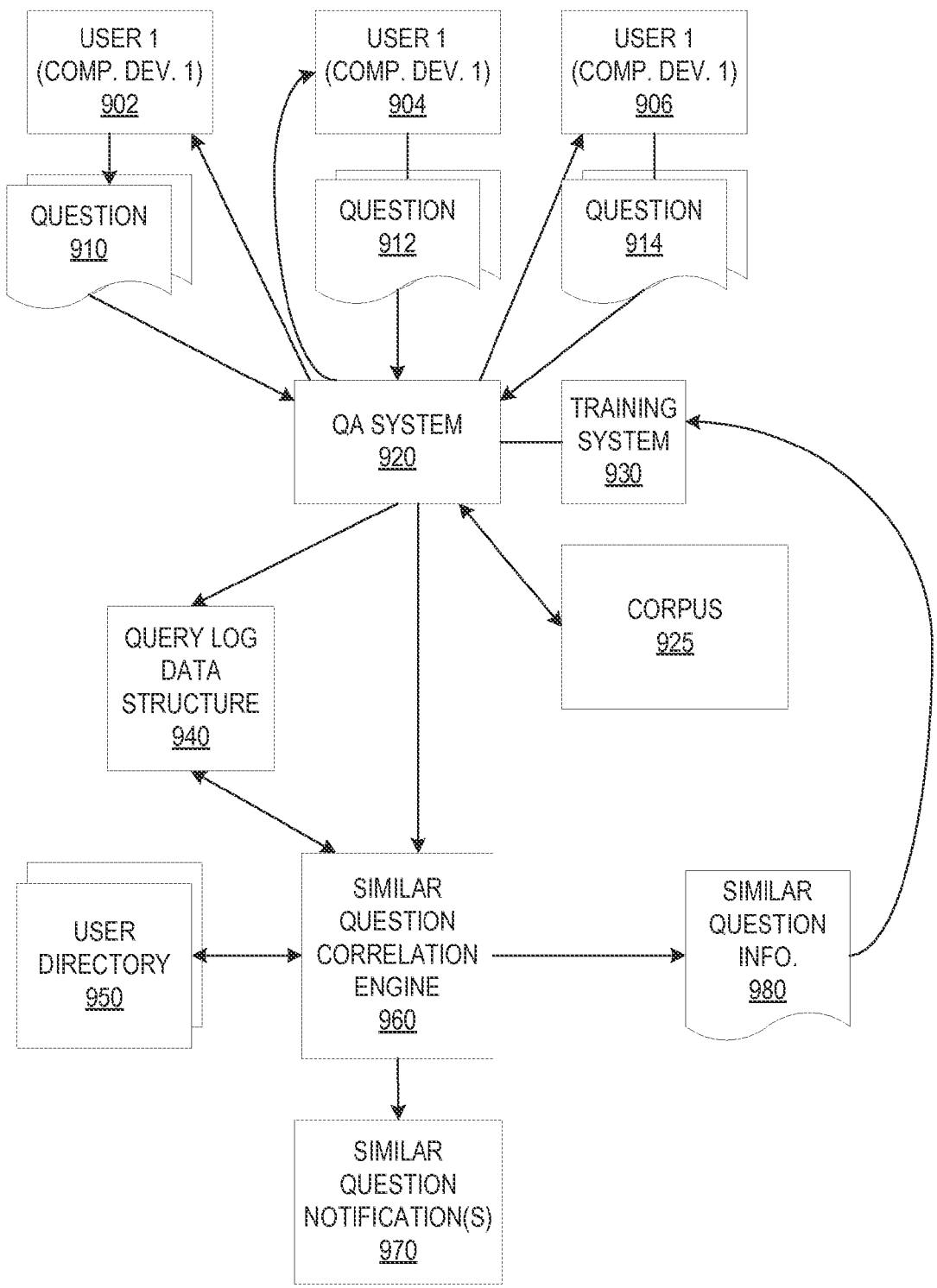
FIG. 9 is an example diagram illustrating an operation for identifying other similar questions posed by other sources and providing information regarding the other similar questions, candidate answers generated for the other similar questions, and information about the other sources in accordance with one illustrative embodiment.

FIG. 9 is an example diagram illustrating an operation for identifying other similar questions posed by other sources and providing information regarding the other similar questions, candidate answers generated for the other similar questions, and information about the other sources in accordance with one illustrative embodiment. As shown in FIG. 9, multiple users 902-906 may submit questions 910-914 to the QA system 920 which then analyzes the question, generates queries for the questions, applies them to the corpus of information 925, and generates answer results that are returned to the users 902-906, where "users" in these embodiments may comprise the client computing devices being utilized by the users to submit the questions 910-914.

The QA system 920, as part of the question analysis, may generate various queries to be applied to the corpus of information. In accordance with the illustrative embodiments, these queries may be logged in a log data structure 940 in association with a question/user pair. That is, an indicator of a question and a user or source of the question 902-906 may be stored in an entry of the log data structure 940. The queries that are generated may likewise be stored in the entry.

Thereafter, when subsequent questions are submitted, the question is analyzed by the QA system 920 to generate queries to apply to the corpus of information 925. As part of the logging operation for logging the generated queries in association with the submitted question and user information in the log data structure 940, the similar question correlation engine 960, which may be a similar question correlation engine 540 in FIG. 5, for example, may perform a search of already logged questions and queries to identify similar questions that generated one or more same queries. As a result, one or more similar questions may be identified along with the users that previously submitted the similar questions.

The user identifier information may be used to search one or more user directories, or other information storing information about individuals that may submit questions to the QA system 920. These user directories may be part of various systems that are remotely located from each other and may be associated with separate organizations, governmental agencies, and the like. For example, the user directories may be a telephone directory data structure, a driver's license data structure, employee directories, a social network directory, or the like. Information about the user may be retrieved from such user directories and provided to the similar questions correlation engine 960. In this way, not only can one determine what similar questions had been previously submitted by users, but in addition information about the particular individuals submitting the similar questions may be identified.

The information regarding the similar questions and users submitting the similar questions may be used to generate a notification 970 that is output to one or more authorized individuals. For example, this mechanism may be used to identify users submitting similar questions about sensitive subject matter directed to organization security, confidential information, or the like. The mechanisms of the illustrative embodiments may identify which users are submitting similar questions directed to similar topics and the like, and may report information about these users to authorized individuals, e.g., law enforcement, company security, or the like.

In addition, the information about the similar questions may be used as feedback 980 to the QA system 920 and/or training engine 930 of the QA system 920, to modify the operation of the QA system 920. Similar questions are a variant of the alternative questions use case described above except that in this case alternative questions are not automatically generated by the system, but rather identified by the processing of primary search query data collected during the normal operation of the QA System. The QA system can then use the re-ranking algorithm describe in the alternative questions use case described above to improve the answers generated.

Figure 10:
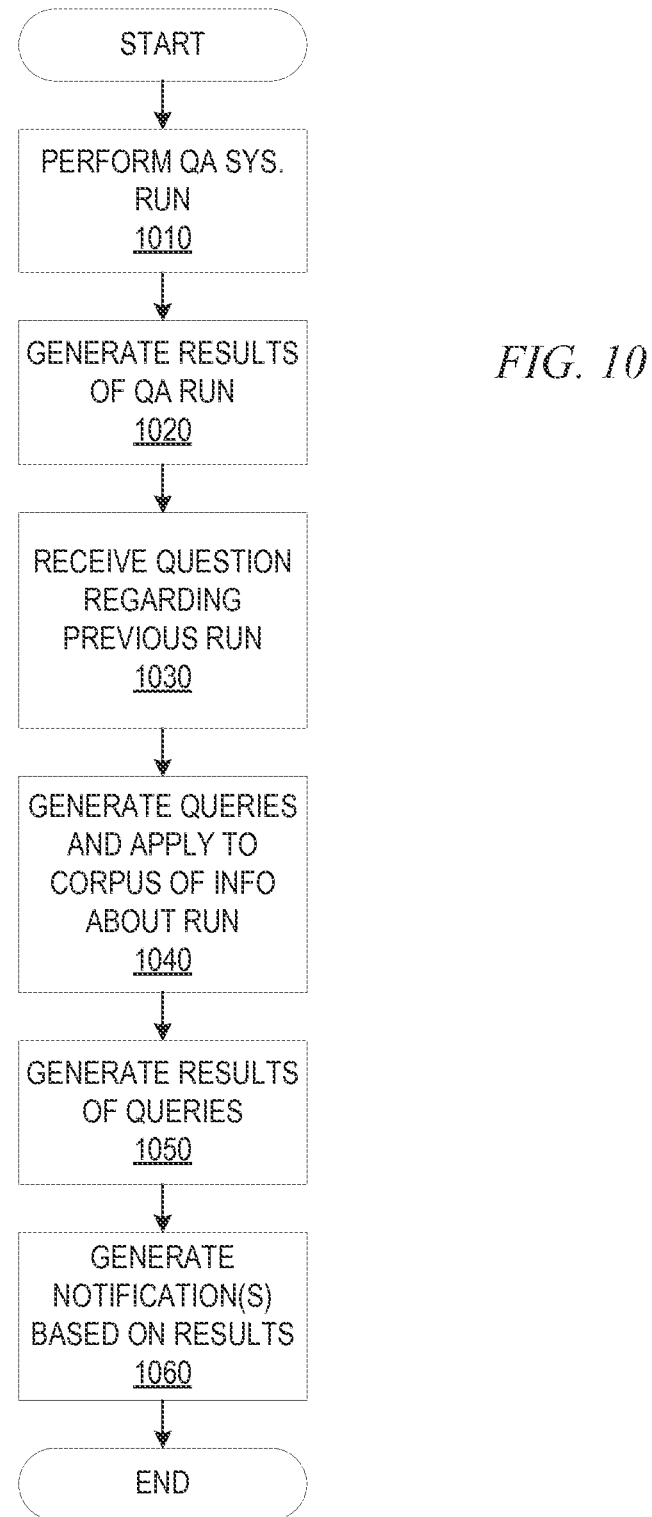
FIG. 10 is a flowchart outlining an example operation for applying a question answering system to answer questions regarding results previously generated by the question answering system.

FIG. 10 is a flowchart outlining an example operation for applying a question answering system to answer questions regarding results previously generated by the question answering system. As shown in FIG. 10, the operation starts by performing an execution or run of a QA system on an input question (step 1010) and generating results of the execution or run (step 1020). Subsequently, a question is input to the QA system regarding the results generated by the QA system during the previous run/execution of the QA system on a different question (step 1030). The question is analyzed by the QA system to generate one or more queries which are applied to a corpus of information comprising one or more of the results of the previous execution/run of the QA system, results of other previous executions/runs of the QA system, code of the modules/engines involved in performing the previous execution/run of the QA system, logs of the previous execution/run of the QA system, or the like. In other words, the corpus of information is not only the corpus of electronic documents or the training set of data upon which the previous QA system execution/run was performed, but a different corpus of information directed to the results of a previous QA system execution/run and the manner by which the results were generated. In one illustrative embodiment, the corpus of information further includes a knowledge database for identifying changes in metrics between runs and the most likely source of the change in the metric.

The question is analyzed to generate a one or more queries that are applied to the corpus of information directed to the results of the previous QA system execution/run (step 1040). Results are generated based on the application of the queries to the corpus of information (step 1050) and the results are used to generate a notification to a user (step 1060) which may include recommendations as to courses of action to take to improve the operation of the QA system. The operation then terminates.

Figure 11:
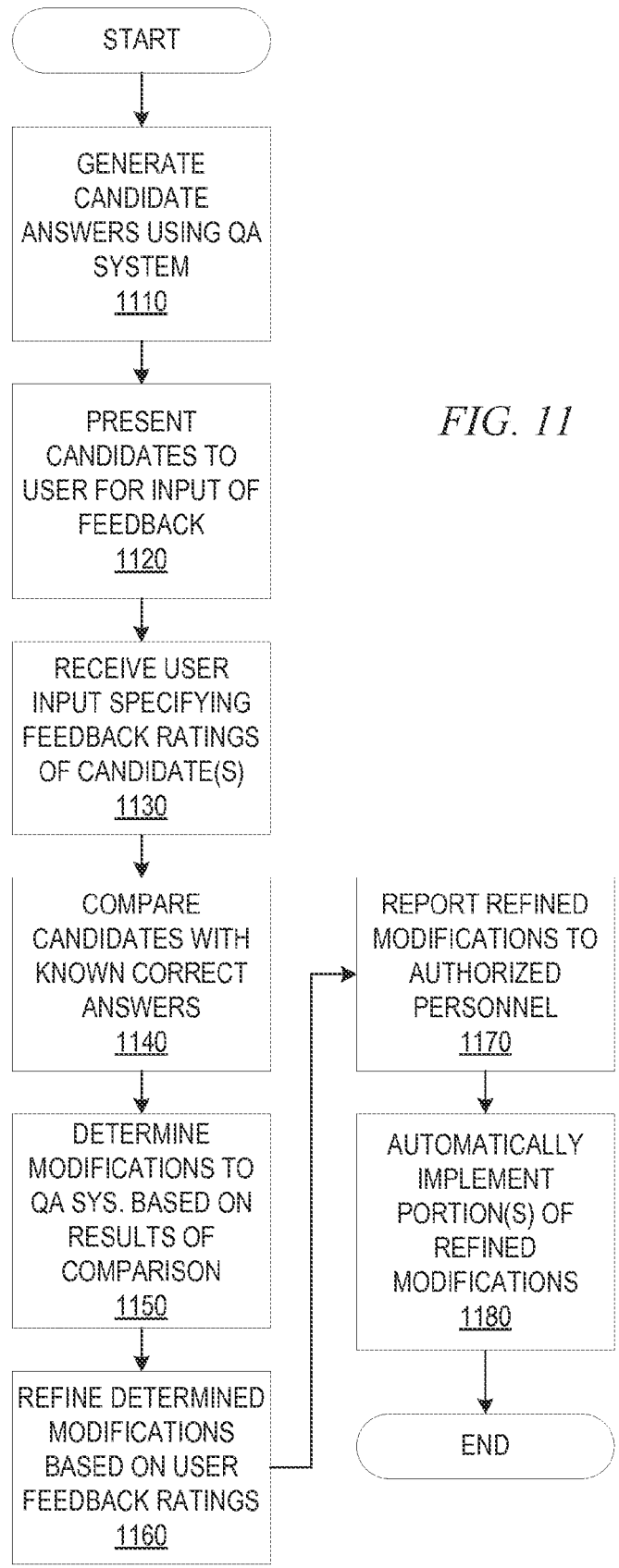
FIG. 11 is a flowchart outlining an example operation for utilizing user feedback ratings of candidate questions in the process of training the logic or model used by a question answering system in accordance with one illustrative embodiment.

FIG. 11 is a flowchart outlining an example operation for utilizing user feedback ratings of candidate questions in the process of training the logic or model used by a question answering system in accordance with one illustrative embodiment. As shown in FIG. 11, the operation starts with the QA system performing answer generation for an input question to generate one or more candidate answers for the input question (step 1110). The candidate answers are presented to a user that submitted the original input question along with fields for specifying a quality of the corresponding candidate answers (step 1120). User input is received for one or more of the candidate answers indicating user specified feedback ratings quantifying the user's perceived quality of the corresponding candidate answer (step 1130). The candidate answers are compared with known correct answers retrieved from a ground truth storage to determine differences between the candidate answers and the known correct answers (step 1140).

A determination of modifications to the QA system model, e.g., logic and/or configuration parameters, to bring the candidate answers in greater conformance with the known correct answers (step 1150). The determined modifications to the QA system are further refined using the user feedback ratings input by the user in step 1130 (step 1160). The resulting refined modifications to the QA system may then be reported to a human analyst to indicate areas where modifications to the QA system model may be made to improve the results generated by the QA system (step 1170). The refined modifications, or portions of the refined modifications, may be automatically implemented through a training engine, such as by modifying configuration parameters for example, to implement the refined modifications or portions of the refined modifications (step 1180). The operation then terminates.

Figure 12:
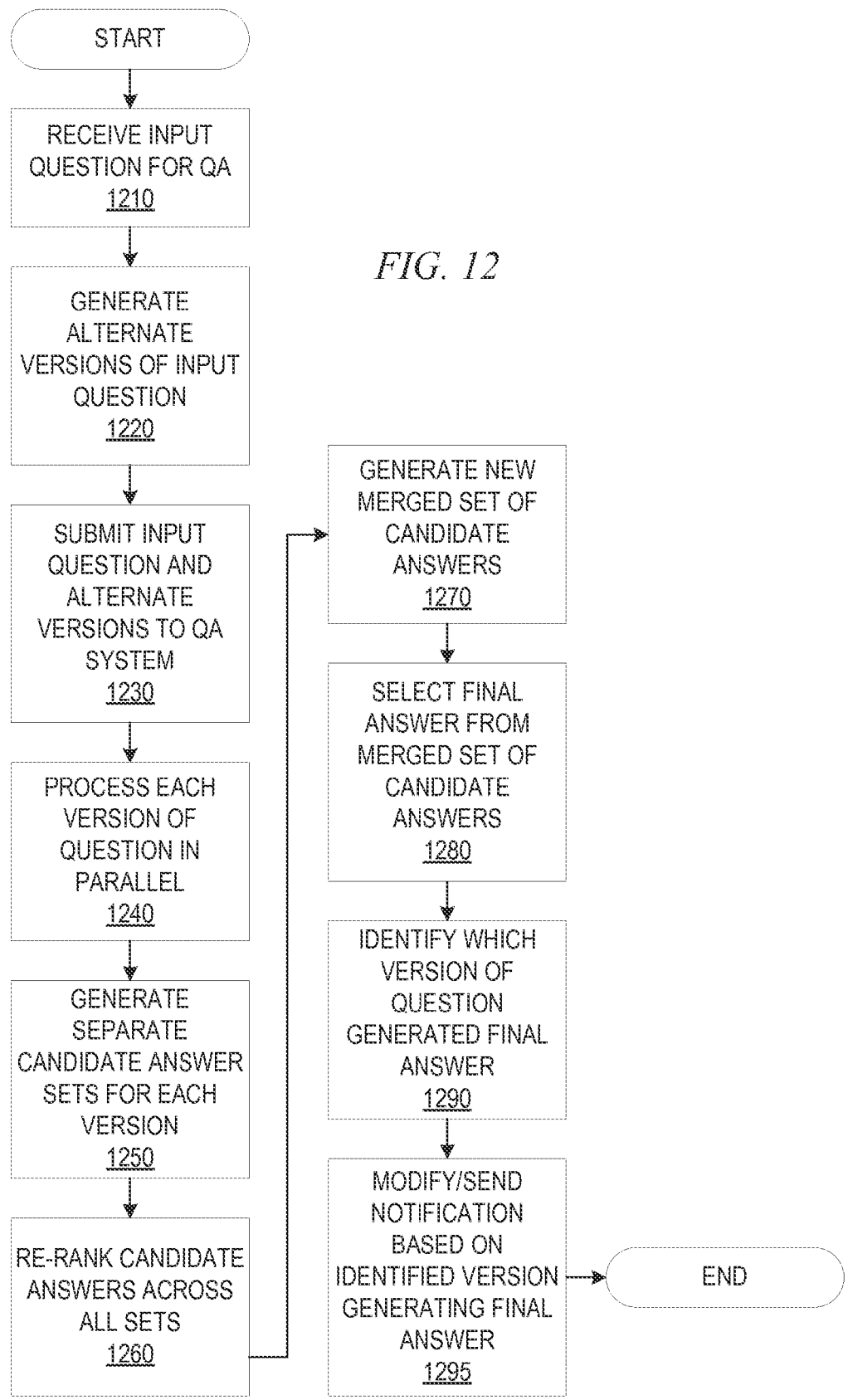
FIG. 12 is a flowchart outlining an operation for generating and processing alternative question formats and ranking both alternative question formats and candidate answers associated with the different alternative question formats in accordance with one illustrative embodiment.

FIG. 12 is a flowchart outlining an operation for generating and processing alternative question formats and ranking both alternative question formats and candidate answers associated with the different alternative question formats in accordance with one illustrative embodiment. As shown in FIG. 12, the operation starts by receiving an input question for processing by a QA system (step 1210). Alternative versions of the input question are generated (step 1220) and submitted in separate threads of execution to the QA system for processing in parallel (step 1230). Each alternative version, and the original version, of the input question are processed in parallel (step 1240) to generate separate sets of candidate answers and a final answer for each of the separate versions of the question (step 1250). The candidate answers are then re-ranked according to the confidence measures of the various candidate answers or final answers of the various versions of the input question (step 1260) to generate a new merged set of candidate answers that spans each of the versions of the input question (step 1270). A highest ranked candidate answer may be selected as the answer to the question (step 1280) and may be used to identify which version(s) of the question resulted in the candidate answer (step 1290). The QA system model, e.g., logic and/or configuration parameters, may be modified, or a notification of the results of the re-ranking and modifications that may be performed to the QA system model may be transmitted to a human analyst, based on the re-ranking and selection of an answer for the input question (step 1295). The operation then terminates.

Figure 13:
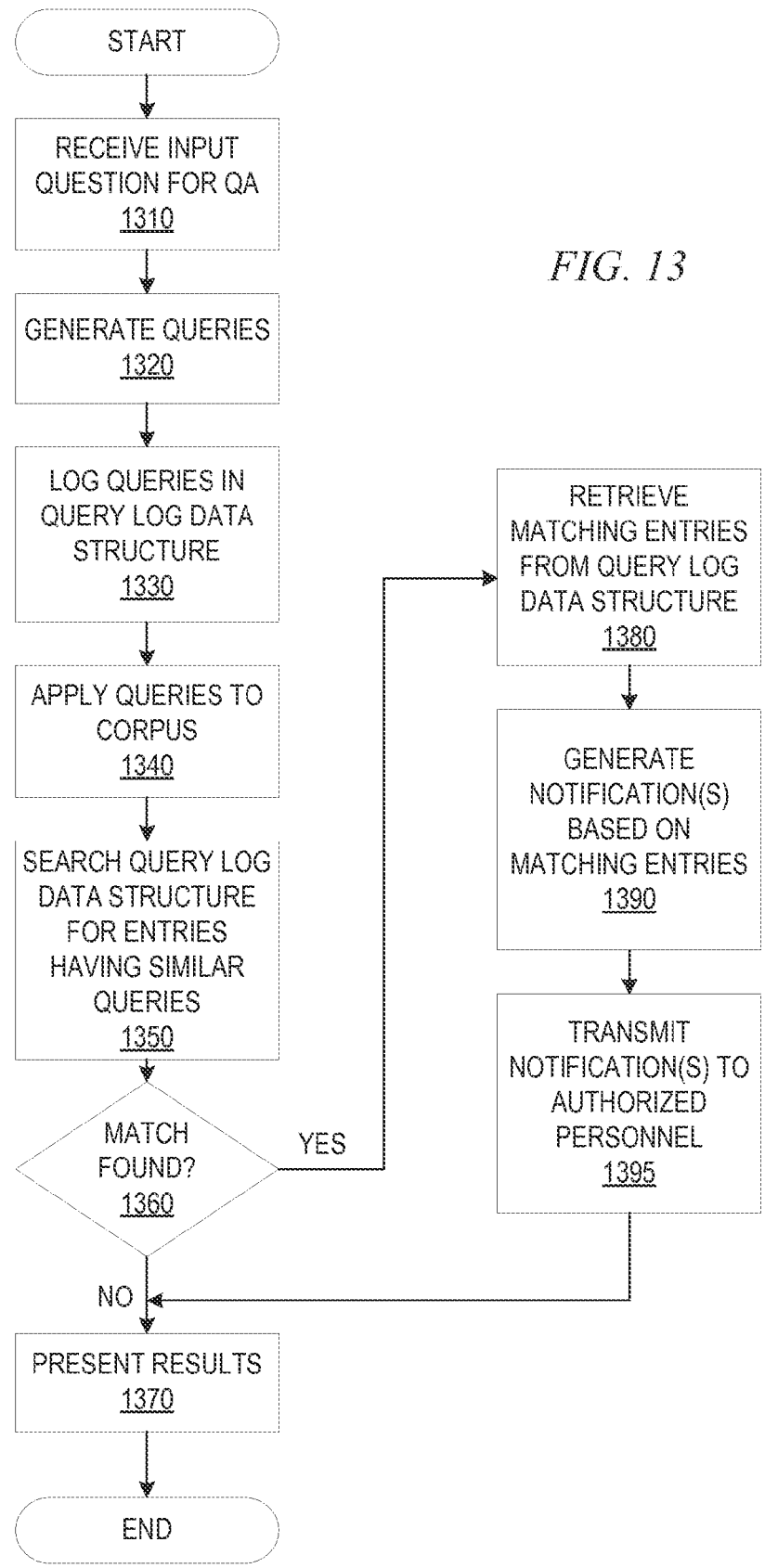
FIG. 13 is a flowchart outlining an operation for identifying other similar questions posed by other sources and providing information regarding the other similar questions, candidate answers generated for the other similar questions, and information about the other sources in accordance with one illustrative embodiment.

FIG. 13 is a flowchart outlining an operation for identifying other similar questions posed by other sources and providing information regarding the other similar questions, candidate answers generated for the other similar questions, and information about the other sources in accordance with one illustrative embodiment. As shown in FIG. 13, the operation starts by receiving an input question for processing by a QA system (step 1310). The input question is analyzed and used to generate one or more queries to be applied to a corpus of information (step 1320). The one or more queries that are generated are logged in a log data structure in association with an identifier of the original question and an identifier of the user, or computing device, that submitted the original input question (step 1330). The one or more queries are applied to the corpus of information and candidate answers to the input question are generated (step 1340).

Thereafter, or at substantially a same time as the generation of the candidate answers, a search of the log data structure is performed to find entries having the same or similar queries associated with the entries (step 1350). A determination is made as to whether there are any entries with matching queries (step 1360). If not, the results of the QA system processing of the input question are presented to the user that submitted the input question (step 1370) and the operation terminates. If there are matching queries identified in the log data structure, the corresponding entry information is retrieved (step 1380) and used to generate a notification indicating the similar previously submitted question and the user, or computing device, that submitted the similar previously submitted question (step 1390). The notification may be then transmitted to appropriate authorized personnel for consideration (step 1395).

Thus, the illustrative embodiments provide mechanisms for answer questions about the reasons behind why a previous run of a QA system generated the results that it did, e.g., what changes occurred from one run to the next, or how the runs of a QA system may be modified to achieve a desired result. Furthermore, the mechanisms of the illustrative embodiments may be used to improve the results generated by a QA system by either automatically modifying, or notifying appropriate personnel of possible modifications to, the QA system to achieve an improved operation. These mechanisms may make use of user feedback ratings of candidate answers to input questions, generate alternative versions of input questions and evaluate candidate answers across all of the alternative versions of the input question, and may identify other similar questions previously submitted by users.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for modifying an operation of a question answering (QA) system, comprising:
   receiving, by the data processing system, an input question;
   processing, by the data processing system, the input question to generate at least one query to be applied to a corpus of information;
   applying, by the data processing system, the at least one query to the corpus of information to generate candidate answers to the input question;
   selecting, by the data processing system, a final answer from the candidate answers for output; and
   modifying, by a training engine associated with the data processing system, using a machine learning technique that compares the final answer to a known correct answer known to be a correct answer for the input question from a ground truth data storage, at least one of logic or configuration parameters of the QA system for at least one of the processing of the input question to generate the at least one query, applying of the at least one query to the corpus of information to generate the candidate answers, or the selecting of the final answer from the candidate answers.

2. The method of claim 1, wherein modifying, using a machine learning technique, at least one of logic or configuration parameters of the QA system comprises:
   presenting the candidate answers via a user interface comprising elements for receiving user feedback ratings of the candidate answers;
   receiving, via the user interface, user input specifying user feedback rating values for at least one of the candidate answers; and
   modifying at least one of the logic or configuration parameters of the QA system based on the received user input specifying the user feedback rating values.

3. The method of claim 2, wherein the user feedback for a candidate answer identifies a user's perceived usefulness or quality of the candidate answer.

4. The method of claim 2, wherein modifying at least one of the logic or configuration parameters of the QA system, comprises, for each candidate answer in the candidate answers:
   determining a difference between the candidate answer and the known correct answer;
   determining a user feedback rating value corresponding to the candidate answer; and
   modifying logic or configuration parameters of the QA system as to modify a computation of a confidence measure associated with the candidate answer based on both the determined difference and the user feedback rating value.

5. The method of claim 2, further comprising:
   accumulating, for an answer source, user rating values for candidate answers generated based on content provided by the answer source to generate an accumulated user rating value for the answer source; and
   modifying confidence measures associated with candidate answers generated based on content provided by the answer source based on the accumulated user rating value.

6. The method of claim 1, wherein modifying, using a machine learning technique, at least one of logic or configuration parameters of the QA system comprises:
   generating one or more alternative versions of the input question;
   processing the one or more alternative versions of the input question using the QA system; and
   generating one or more candidate answers for each of the one or more alternative versions of the input question, wherein selecting a final answer from the one or more candidate answers comprises selecting a final answer from amongst all of the candidate answers generated for each of the input question and the one or more alternative versions of the input question.

7. The method of claim 6, wherein generating one or more alternative versions of the input question comprises at least one of reordering words in the input question, changing an inflection of a word in the input question, or replacing a word in the input question with a synonym.

8. The method of claim 6, wherein selecting a final answer from amongst all of the candidate answers generated for each of the input question and the one or more alternative versions of the input question comprises selecting a highest confidence measure question from amongst the input question and the one or more alternative versions of the input question.

9. The method of claim 6, further comprising:
   inputting, to the training engine, the selected final answer from amongst all of the candidate answers generated for each of the input question and the one or more alternative versions of the input question; and
   modifying logic or configuration parameters of the QA system based on the input of the selected final answer from amongst all of the candidate answers generated for each of the input question and the one or more alternative versions of the input question.

10. The method of claim 1, wherein modifying, using a machine learning technique, at least one of logic or configuration parameters of the QA system comprises:
    logging the at least one query in a log data structure in association with an identifier of the input question and a source of the input question;
    performing a search of the log data structure based on the at least one query to identify one or more matching entries in the log data structure having at least one matching query in the at least one query; and
    outputting a notification of the one or more matching entries based on results of performing the search of the log data structure.

11. A computer program product comprising a computer readable storage medium having a computer readable program stored therein, wherein the computer readable program, when executed on a computing device, causes the computing device to:
    receive an input question;

process the input question to generate at least one query to be applied to a corpus of information;

apply the at least one query to the corpus of information to generate candidate answers to the input question;

select a final answer from the candidate answers for output; and modify, by a training engine associated with the data processing system, using a machine learning technique that compares the final answer to a known correct answer known to be a correct answer for the input question from a ground truth data storage, at least one of logic or configuration parameters of the QA system for at least one of the processing of the input question to generate the at least one query, applying of the at least one query to the corpus of information to generate the candidate answers, or the selecting of the final answer from the candidate answers.

12. The computer program product of claim 11, wherein modifying, using a machine learning technique, at least one of logic or configuration parameters of the QA system comprises:

presenting the candidate answers via a user interface comprising elements for receiving user feedback ratings of the candidate answers;

receiving, via the user interface, user input specifying user feedback rating values for at least one of the candidate answers; and modifying at least one of the logic or configuration parameters of the QA system based on the received user input specifying the user feedback rating values.

13. The computer program product of claim 12, wherein the user feedback for a candidate answer identifies a user's perceived usefulness or quality of the candidate answer.

14. The computer program product of claim 12, wherein modifying at least one of the logic or configuration parameters of the QA system, comprises, for each candidate answer in the candidate answers:

determining a difference between the candidate answer acid the known correct answer;

determining a user feedback rating value corresponding to the candidate answer; and modifying logic or configuration parameters of the QA system so as to modify a computation of a confidence measure associated with the candidate answer based on both the determined difference and the user feedback rating value.

15. The computer program product of claim 12, wherein the computer readable program further causes the computing device to:

accumulate, for an answer source, user rating values for candidate answers generated based on content provided by the answer source to generate an accumulated user rating value for the answer source; and modify confidence measures associated with candidate answers generated based on content provided by the answer source based on the accumulated user rating value.

16. The computer program product of claim 11, wherein modifying, using a machine learning technique, at least one of logic or configuration parameters of the QA system comprises:

generating one or more alternative versions of the input question;

processing the one or more alternative versions of the input question using the QA system; and generating one or more candidate answers for each of the one or more alternative versions of the input question, wherein selecting a final answer from the one or more candidate answers comprises selecting a final answer from amongst all of the candidate answers generated for each of the input question and the one or more alternative versions of the input question.

17. The computer program product of claim 16, wherein generating one or more alternative versions of the input question comprises at least one of reordering words in the input question, changing an inflection of a word in the input question, or replacing a word in the input question with a synonym.

18. The computer program product of claim 16, wherein selecting a final answer from amongst all of the candidate answers generated for each of the input question and the one or more alternative versions of the input question comprises selecting a highest confidence measure question from amongst the input question and the one or more alternative versions of the input question.

19. The computer program product of claim 16, wherein the computer readable program further causes the computing device to:

input, to the training engine, the selected final answer from amongst all of the candidate answers generated for each of the input question and the one or more alternative versions of the input question; and modify logic or configuration parameters of the QA system based on the input of the selected final answer from amongst all of the candidate answers generated for each of the input question and the one or more alternative versions of the input question.

20. The computer program product of claim 11, wherein modifying, using a machine learning technique, at least one of logic or configuration parameters of the QA system comprises:

logging the at least one query in a log data structure in association with an identifier of the input question and a source of the input question;

performing a search of the log data structure based on the at least one query to identify one or more matching entries in the log data structure having at least one matching query in the at least one query; and outputting a notification of the one or more matching entries based on results of performing the search of the log data structure.

21. An apparatus, comprising:

a processor; and a memory coupled to the processor, wherein the memory comprises instructions which, when executed by the processor, cause the processor to:

receive an input question;

process the input question to genera at least one query to be applied to a corpus of information;

apply the at least one query to the corpus of information to generate candidate answers to the input question;

select a final answer from the candidate answers for output; and modify, by a training engine associated with the data processing system, using a machine learning technique that compares the final answer to a known correct answer known to be a correct answer for the input question from a ground truth data storage, at least one of logic or configuration parameters of the QA system for at least one of the processing of the input question to generate the at least one query, applying of the at least one query to the corpus of information to generate the candidate answers, or the selecting of the final answer from the candidate answers.

22. The apparatus of claim 21, wherein modifying, using a machine learning technique, at least one of logic or configuration parameters of the QA system comprises:
- presenting the candidate answers via a user interface comprising elements for receiving user feedback ratings of the candidate answers;
- receiving, via the user interface, user input specifying user feedback rating values for at least one of the candidate answers; and
- modifying at least one of the logic or configuration parameters of the QA system based on the received user input specifying the user feedback rating values.

23. The apparatus of claim 21, wherein modifying, using a machine learning technique, at least one of logic or configuration parameters of the QA system comprises:
- generating one or more alternative versions of the input question;
- processing the one or more alternative versions of the input question using the QA system; and
- generating one or more candidate answers for each of the one or more alternative versions of the input question, wherein selecting a final answer from the one or more candidate answers comprises selecting a final answer from amongst all of the candidate answers generated for each of the input question and the one or more alternative versions of the input question.

24. The apparatus of claim 21, wherein modifying, using a machine learning technique, at least one of logic or configuration parameters of the QA system comprises:
- logging the at least one query in a log data structure in association with an identifier of the input question and a source of the input question;
- performing a search of the log data structure based on the at least one query to identify one or more matching entries in the log data structure having at least one matching query in the at least one query; and
- outputting a notification of the one or more matching entries based on results of performing the search of the log data structure.

* * * * *